(12) United States Patent
Berger et al.

(10) Patent No.: US 7,432,455 B2
(45) Date of Patent: Oct. 7, 2008

(54) FRAME FOR A MONITORING SCALE

(75) Inventors: Hermann Berger, Adenstedt (DE); Nikolaos Georgitsis, Hamburg (DE)

(73) Assignee: Mettler-Toledo Garvens GmbH, Giessen (DE)

( * ) Notice: Subject to any disclaimer, the term of this patent is extended or adjusted under 35 U.S.C. 154(b) by 12 days.

(21) Appl. No.: 11/407,877

(22) Filed: Apr. 19, 2006

(65) Prior Publication Data

US 2006/0289277 A1 Dec. 28, 2006

(30) Foreign Application Priority Data

Apr. 19, 2005 (DE) ........................ 10 2005 018 097

(51) Int. Cl.
*G01G 21/28* (2006.01)
*G01G 11/00* (2006.01)
*F16M 9/00* (2006.01)

(52) U.S. Cl. ................... 177/119; 177/238; 177/244; 248/563; 198/860.1

(58) Field of Classification Search ............. 198/860.1; 177/119, 145, 238–244; 248/562, 638
See application file for complete search history.

(56) References Cited

U.S. PATENT DOCUMENTS

| | | | | |
|---|---|---|---|---|
| 3,017,992 A | | 1/1962 | Matti | |
| 3,869,007 A | * | 3/1975 | Haggstrom et al. | 177/211 |
| 4,557,341 A | * | 12/1985 | Soderholm | 177/16 |
| 5,111,896 A | * | 5/1992 | Porcari et al. | 177/16 |
| 5,294,756 A | * | 3/1994 | Lauber et al. | 177/119 |
| 5,296,654 A | * | 3/1994 | Farley et al. | 177/145 |
| 5,297,652 A | * | 3/1994 | Armond et al. | 182/63.1 |
| 5,304,745 A | | 4/1994 | Rusk et al. | |
| 6,591,979 B1 | * | 7/2003 | Karpy | 198/860.1 |
| 6,703,568 B2 | * | 3/2004 | Wako et al. | 177/25.18 |
| 6,803,529 B2 | * | 10/2004 | Takahashi | 177/119 |
| 7,114,615 B1 | * | 10/2006 | Karpy | 198/860.1 |
| 7,307,225 B2 | * | 12/2007 | Berger | 177/119 |

FOREIGN PATENT DOCUMENTS

| | | |
|---|---|---|
| AU | 469535 B2 | 2/1976 |
| GB | 2017619 A | 10/1979 |
| WO | WO 9728073 | 8/1997 |

OTHER PUBLICATIONS

Meier, J. (Marketing): "Garvens press texts for the IFFA 2004 trade fair: New Hygiene standard with the Garvens S3-Shark" Internet Article, [Online] URL:http://www.garvens.de/pdf/Pressetext_SHARK_english.pdf—the whole document.

* cited by examiner

*Primary Examiner*—Randy W Gibson
(74) *Attorney, Agent, or Firm*—Schwabe Williamson & Wyatt (57) ABSTRACT

A frame for a monitoring scale includes a supporting part and two transverse parts by which the frame is supported on the floor. The frame includes a hollow body that may be filled with a ballast material, such as an antiseptic medium, to suppress longitudinal vibrations and to reduce hygienic effects of excess. In addition, a special design of longitudinal supports is provided.

42 Claims, 8 Drawing Sheets

FRAME FOR A MONITORING SCALE

CROSS REFERENCE TO RELATED APPLICATIONS

The present application claims International Priority under 35 U.S.C. §119 to co-pending German Patent Application No. 10 2005 018 097.3, filed Apr. 19, 2005, entitled "Gestell für eine Kontrollwaage" the entire contents and disclosure of which is hereby incorporated by reference in its entirety.

TECHNICAL FIELD

The invention relates to the field of support structures, such as a frame for a monitoring scale system. More particularly, various embodiments of the invention relate to techniques for stabilizing a frame designed to support a monitoring scale system configured to transport and to weigh goods.

BACKGROUND

Monitoring scales are used for monitoring package weights, particularly in the pharmaceutical and food industries. The packages to be monitored are delivered to an entry transport belt and from there are transferred to a weighing belt. As they pass over the weighing belt, the weight of the packages is dynamically determined by a load cell. After passing over the weighing belt, the packages are carried off by an exit belt situated downstream. Off-weight packages are identified by this dynamic weighing process, and a pushing device ejects the off-weight packages transverse to their direction of transport in the longitudinal direction.

In this dynamic weighing operation, vibrations are often induced in particular by the transfer of incoming packages from the entry belt to the weighing belt, and from the weighing belt to the exit belt. In addition, the operation of the pushing device is another source of vibrations. For the frame, this results in the difficult task of attempting to suppress these undesirable vibrations to the greatest extent possible. With regard to the relative stability required for suppression of vibrations, such known frames are in need of improvement.

Another problem is that contents of the packages to be weighed, which in particular may be liquid, granular, or powdered, may get on the frame as a result of unavoidable irregularities during the course of operations, and remain there. As the known frames often represent complex welded structures composed of metal braces extending in the longitudinal and transverse directions, the frames are very susceptible to soiling and are difficult to clean.

A frame exhibiting a somewhat simpler assembly structure is described in German Patent Application 103 57 982.6, which represents an improvement over the available prior art with regard to the above-referenced problems. In the cited application, the transverse part is designed in the shape of a flat plate, the main plane of which extends transverse to the longitudinal direction. Such a design of the transverse part satisfies some of the stability issues in the vertical direction despite its relatively small dimension in the longitudinal direction, since the corresponding vertical load acting on the supporting longitudinal part of the frame is substantially diverted from the flat plate, in the direction of the main plane thereof, to the floor. At the same time, for such a frame the horizontally running surface region of the transverse part is negligibly small, so that such a design is also advantageous for technical cleaning reasons. Furthermore, such a frame promotes suppression of undesirable vibrations whereby, depending on the requirements, the mass of the frame is modified by filling the longitudinal part with gravel, for example.

However, such a frame described in Patent Application 103 57 982.6 has not proven to be entirely satisfactory with regard to suppression of vibrations in the longitudinal direction (direction of the conveyor belt). Such vibrations occur in the longitudinal direction particularly when products that are transported on the transport belts supported by the frame experience a change in velocity during the transition from a customer-side transport belt to the frame-supported belts, by which the forces which then compensate for the pulse balance are transmitted to the frame.

SUMMARY

Embodiments of the invention provide a support frame for a monitoring scale system that overcomes the hereinaforementioned disadvantages of the heretofore-known devices of this general type and that promotes suppression of undesirable vibrations in the longitudinal direction in such a way that the refined frame has improved stability in the longitudinal direction. With respect to the frame the improved longitudinal vibration suppression is achieved, according to various embodiments of the invention, by providing a transverse part of the support frame in the shape of a hollow body.

With the foregoing and other aspects in view, there is provided, in accordance with at least one embodiment of the invention, a monitoring scale including a frame, a load cell and a weighing belt for transporting and weighing goods. The load cell is supported on the frame and supports the weighing belt designed to circulate in a longitudinal direction. The frame includes a longitudinal part which extends in the longitudinal direction and on which is fixed at least one transverse part that extends transverse to the longitudinal direction. In one embodiment, the at least one transverse part is configured to support the frame on the floor. In at least one embodiment, the transverse part of the frame is designed in the form of a hollow body. In accordance with another feature, the frame includes the longitudinal part designed to be used as the supporting part. In accordance with a further feature of the invention, this longitudinal part may be designed to be flexurally and torsionally rigid such that the basic stability required for the particular application is achieved. For example, a frame length of about 300 cm in the longitudinal direction thereof is easily obtained by use of a cylindrical tube having a diameter in the range of about 250 to about 300 mm. Even longer frames having a length of about 500 cm are possible in various embodiments with the previously described frame structure.

The hollow body forming the transverse part has sufficient stability in the vertical direction despite relatively thin hollow body walls, because the load acting on the supporting longitudinal part of the frame is diverted by the hollow body in a surface direction perpendicular to the direction of the wall thickness. Furthermore, compared to a transverse part designed as a flat plate, the transverse part according to various embodiments of the invention also has high stability and flexural strength in the longitudinal direction, since the hollow body has surface regions with surface direction components parallel to the longitudinal direction. Thus, vibrations in particular in the longitudinal direction may be satisfactorily absorbed. The transverse part according to various embodiments of the invention is thus configured to achieve high longitudinal stability, with good cleaning capability despite large surface areas.

The design of the transverse parts as hollow bodies also permits further improvement in the suppression of vibration, since the transverse parts may also be filled with a ballast material. On the other hand, transport of the frame in the unfilled state is simplified.

A further inventive concept lies in the fact that at least one longitudinal support extending parallel to the longitudinal part is provided which has one end facing toward the load cell and situated at a distance therefrom. The longitudinal support as well provides an additional reinforcement part in the longitudinal direction for increased longitudinal stability. A particularly high longitudinal stability is achieved in accordance with various embodiments of the invention by combining the transverse part and the longitudinal support in the design of the frame.

In various embodiments of the invention, the longitudinal support may also serve the function of an attachment element for additional components, due to the fact that any given conveyor belt elements may be attached thereto.

The system also provides improved performance with regard to manufacturing technology. The customer-specific dimensions of the frame are determined by the dimensions of the longitudinal part and the transverse part. Corresponding trimming of the longitudinal part results in the frame dimension in the horizontal direction. The installation space in the vertical direction may be specified by sizing of the transverse part. This transverse part may be produced in a particularly simple manner, for example, from parts cut from a rough sheet by laser cutting. The sheet thickness of such parts may be less than 10 mm, for example, because both longitudinal and vertical forces are supported by the hollow body structure.

The frame according to various embodiments of the invention also has a use with regard to hygienic factors. The hollow body provided according to various embodiments of the invention may be filled with a stability-enhancing ballast material in the form of an antiseptic medium. In this manner contamination of the cavities by bacteria, which may occur, for example, when a hollow body is inadvertently drilled through, is prevented. According to experience, contamination which is not externally visible is particularly problematic and hazardous because the "hidden" bacteria may infiltrate further into the surroundings even after the surface is decontaminated, and the frame user may be totally unaware of the source of the bacteria which will continually appear in the equipment, an especially critical problem in the food sector.

In concept, the frame according to various embodiments of the invention is less susceptible to soiling and easily cleanable, since the proportion of horizontal surfaces on the frame to overall frame surfaces is as low as possible. In at least one embodiment, the frame is designed to provide a cleaning jet (the direction on both sides being perpendicular to the longitudinal direction) with the smallest possible operating surface.

One embodiment provides the transverse parts as hollow bodies having a substantially cubic basic shape. With regard to simple production, the hollow body may be composed, in one embodiment, of two parallel, flat side areas and a lateral surface which connects the two sides along their peripheries. The side areas and lateral surfaces may be produced in a particularly simple manner from parts cut from a rough sheet by laser cutting.

In various embodiments of the invention, the top side of the lateral surface has a convex shape so that for technical cleaning reasons a horizontal surface is not produced that is susceptible to soiling. Likewise, an outwardly curved design of the side regions of the lateral surface is particularly advantageous with respect to cleaning with a cleaning jet directed parallel to the side areas.

One embodiment provides that one of the transverse parts is situated at each of the two longitudinal end regions of the longitudinal part. In this manner the two transverse parts may form the vertical head parts of the frame, between which the longitudinal part extends and to which the longitudinal part is attached at its longitudinal ends by welding, for example. However, in one embodiment, the longitudinal part may not terminate at the transverse part, but can pass through the transverse part or extend beyond same. In this case, corresponding holes are cut in the transverse parts through which the longitudinal part is guided joint-tight, being attached along the contact edges by welding, for example.

In addition, at least one longitudinal support extending parallel to the longitudinal part and having one end facing the load cell and situated at a distance therefrom is used for suppression of longitudinal vibrations. A longitudinal support is attached to a transverse part by welding, for example. A support bar is advantageously provided for a second support point for the longitudinal support. Such a support bar preferably is provided in the form of a plate, transverse to the longitudinal direction (small contact surface for the cleaning jet) and on a side facing the floor is attached by welding, for example, to the longitudinal part so as to support same. The longitudinal support itself is then supported on the opposite side of the support bar, i.e., the side facing away from the floor, and is attached thereto by welding, for example.

In a further embodiment, pairs of longitudinal supports, in parallel and separated at a distance from one another, are provided. This is particularly advantageous, since such a pair attached to a transverse part and to a support bar, with both the transverse part and the support bar in turn attached to the longitudinal part, forms a particularly stable structure with regard to suppression of longitudinal vibrations.

Furthermore, in one embodiment, a pair of longitudinal supports extends from a region close to a longitudinal end region of the longitudinal part in the direction of the center of the frame. Together with an additional pair of longitudinal supports supported and fixed not to a transverse part, but rather in a center region of the longitudinal support on at least two support bars, the pair forms an attachment plane to which the conveyor belt elements may be fastened. The respective, mutually facing ends of the longitudinal support for each pair are aligned with one another transverse to the longitudinal direction. In one embodiment, the mutual distance between the longitudinal supports of a pair is not greater than the width of a conveyor belt element. This embodiment provides a suitable attachment of the belt elements to the longitudinal supports. In addition, the longitudinal supports together with the mounted conveyor belt elements do not interfere with the attachment of additional components of the monitoring scale.

In a further embodiment, the longitudinal supports fixed to a transverse part are supported on the transverse part, and thus are able to project beyond the end of the transverse part. Such a configuration is particularly useful, since the attachment of a conveyor belt element is not limited or impeded by the transverse part. The longitudinal supports may also project beyond the respective end-face end of the longitudinal part. This provides that the user can use the conveyor belt element supported on the frame, when the overall length extends farther than the overall length of the frame (longitudinal part).

One embodiment provides two lugs, separated at a distance from one another, at a region of a support bar facing away from the floor, and attaches each longitudinal part of a pair to such a lug. The height of the support points of the longitudinal supports measured from the floor, and thus the corresponding regions of the transverse part and the region of such a lug farthest from the floor, are provided such that a longitudinal support is aligned in the longitudinal direction substantially parallel to the floor. The lug-shaped attachment region of the support bars provides that no other regions of the support bar extend into the region between the longitudinal supports of a pair, so that a conveyor belt element attached to these longitudinal supports can be moved, i.e., in the direction of the conveyor belt (longitudinal direction), without colliding with regions of the support bars.

In a further embodiment, at least one additional frame part is provided, extending parallel to the longitudinal part and fixed to each of the transverse parts. In particular, four such additional frame parts are present, each of which is fixed in a corner region of each region of the substantially rectangular side areas of the region associated with the plate-shaped transverse parts. For additional reinforcement of the frame, transverse bars having a greater thickness in the longitudinal direction may be provided at certain intervals, in particular along the longitudinal direction, which are connected to both the longitudinal part and at least one of the additional frame parts. These additional frame parts, together with the transverse bars, provide additional reinforcement of the frame, and offer another possibility besides the attachment plane of the longitudinal supports for attaching components of the monitoring scale.

With regard to the cross sections of all existing parts situated in the longitudinal direction, it is suitable for the cross section of an additional frame part to be smaller than the cross section of the longitudinal part, and for the cross section of one longitudinal part in turn to be smaller than the cross section of an additional frame part. This provides that the predominantly supporting and stabilizing function of the longitudinal part also demonstrates various advantages regarding appearance. Furthermore, the relatively small cross sections of the longitudinal supports are particularly well suited for attachment of a belt element by using a simple clamping device.

In a further embodiment, the side wall regions or the side edges of the transverse part are indented in such a way that the transverse part does not project beyond the additional frame parts. In this manner the transverse part does not interfere with the attachment of components of the monitoring scale such as bins, pushers, etc, and in particular such components may also be directly attached at the location of the transverse part. Such a variable attachment possibility for the components of the monitoring scale is also used for another design in which the additional frame parts may project beyond a transverse part. The respective adjacent ends of the longitudinal part and the additional frame parts preferably are aligned with one another transverse to the longitudinal direction.

The longitudinal part and/or the additional frame parts and/or the longitudinal supports may have a convex shape in their region facing away from the floor. As a result of this convex design of the upwardly pointing cross-sectional region, there are no upwardly facing horizontal surfaces on which solid or liquid weighed goods can remain. Instead, such parts situated in the longitudinal direction have surfaces that are upwardly inclined with respect to the horizontal, from which any falling weighed good slide or run off. These attributes are provided in particular for elliptical/circular cross sections. For rectangular cross sections, for meeting these attributes it is sufficient for the cross-sectional diagonals to be aligned perpendicular to the floor.

In a further embodiment, the cross section of the longitudinal supports is elliptical, in particular circular. Such longitudinal supports are particularly suited for use as attachment parts for simple clamping devices provided on the conveyor belt elements. Thus, for example, a clamping device may have a recess, corresponding to the shape of the cross section of the longitudinal support, in which the longitudinal support is accommodated and then clamped tight by a locking bar which closes off the recess.

Within the scope of various embodiments of the invention, the longitudinal part may also be designed as a hollow tube and, similarly as for the hollow body-like transverse parts, filled with a ballast material. By filling the hollow bodies with a ballast material, which may be a bulk material such as gravel, it is possible to significantly increase the mass of the frame and thereby achieve a correspondingly high degree of vibration suppression. Suitable ballast materials such as gravel can usually be obtained very economically at the installation site for the frame. At the same time, in the unfilled state, the frame, in various embodiments, has a greatly reduced weight and can be transported much more easily to the installation site. The longitudinal part and optionally the hollow body-like transverse parts have a filling opening, in one embodiment, the filling opening includes a quick-connect coupling. The filling opening enables the hollow bodies to be easily filled.

Furthermore, various embodiments with the hollow bodies are also provided with an outlet opening, in particular a screw-type outlet opening, and optionally have a ventilation pipe which preferably extends from a lower region to a topmost region inside the hollow body. The outlet opening and ventilation pipe is particularly useful when the hollow bodies are re-emptied for interim transport, for example, in particular when the ballast material is a liquid.

In one embodiment, the ballast material is an antiseptic medium. In this manner, filled hollow bodies prevent contamination of their interiors by bacteria. In particular, holes or leaks which occur in a cavity are thereby automatically disinfected. This advantage is achieved in a particularly simple and economical manner by use of $H_2O$ with added disinfectant.

In a further embodiment, the antiseptic medium may be dyed. A leak in one of the cavities may be identified and addressed immediately as a result of the dyed antiseptic medium which flows out.

As a rule, the height of the frame, and therefore the height of the transport belt element, is determined by the height of the transverse parts. In a further embodiment, feet which are attached to the transverse part are additionally provided for supporting the frame on the floor. In particular, height-adjustable feet may be screwed to the transverse part, for example. In this manner, fine adjustments to the height may be made on the customer side, and in addition compensation may be made for localized irregularities of the floor.

The present invention also encompasses in its scope of protection a method for stabilizing a frame for a monitoring scale. This is accomplished by opening the filling opening, filling the cavity with a ballast material, and subsequently closing the filling opening increases the mass of the frame, resulting in a high degree of vibration suppression.

In various embodiments, a support frame is stabilized by filling the cavity of the hollow body with an antiseptic medium as ballast material. The stabilization method is therefore concurrently decontaminating cavities of a support frame for a monitoring scale.

The method is suitably carried out at the frame installation site. This has the advantage that the frame is more easily transported to the site before it is stabilized by increased mass and also that the customer feels more secure when the method is carried out professionally in his presence.

BRIEF DESCRIPTION OF THE DRAWINGS

The various presented embodiments will be described by way of exemplary configurations, but not limitations, illustrated in the accompanying drawings in which like references denote similar elements, and in which.

DETAILED DESCRIPTION OF THE DRAWINGS

In the following detailed description, reference is made to the accompanying drawings, which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

First, a support frame is described with reference to FIGS. 1 through 4, which serves solely to explain the applicable starting points for the embodiments further described below.

Figure 1:
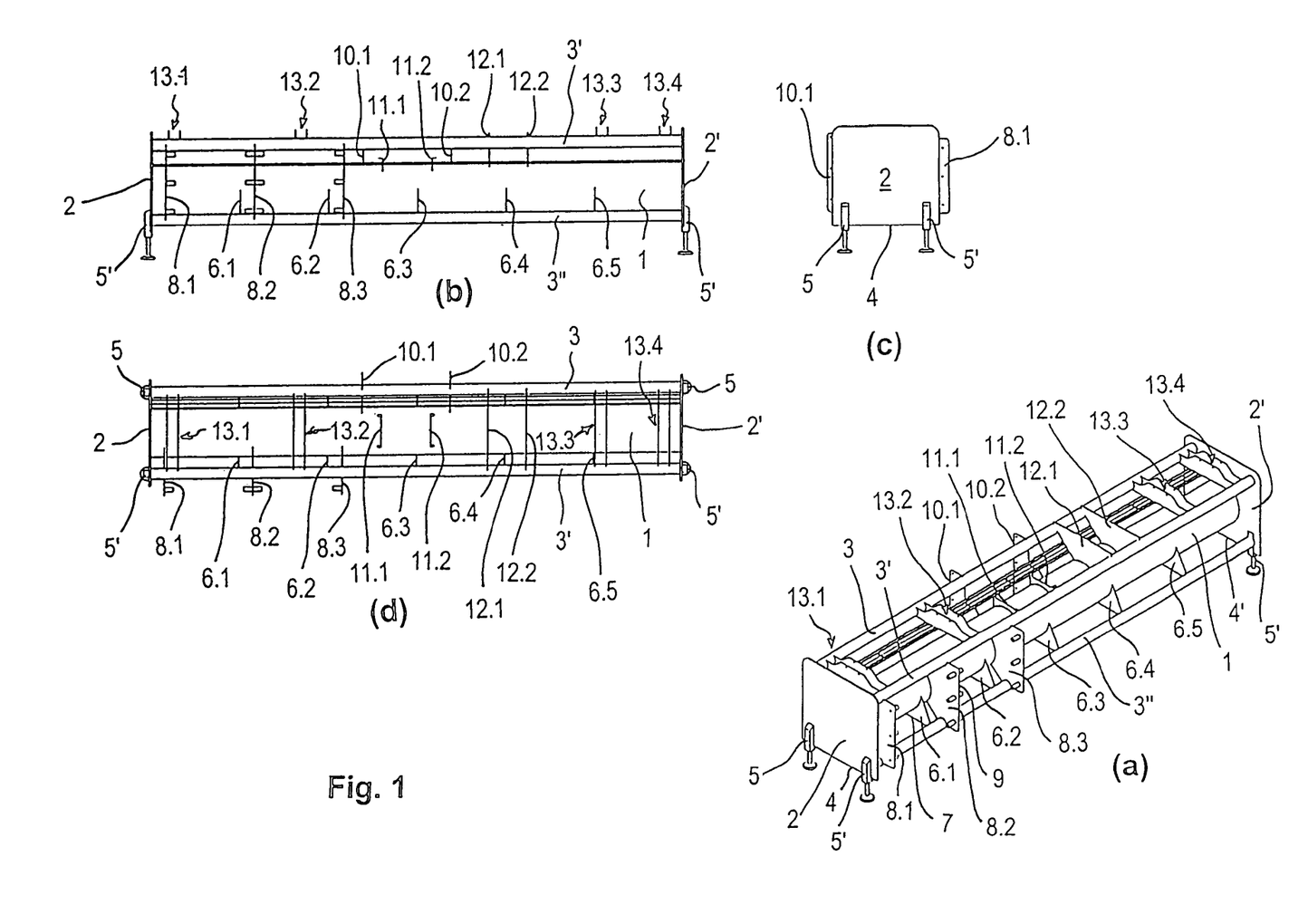
FIG. 1A is a perspective view from above of a support frame for a monitoring scale in accordance with various embodiments.
FIG. 1B is a side view of the frame, as presented in FIG. 1A in further detail, in accordance with various embodiments.
FIG. 1C is an end view of the frame, as presented in FIG. 1A in further detail, in accordance with various embodiments.
FIG. 1D is a top view of the frame, as presented in FIG. 1A in further detail, in accordance with various embodiments.

A frame illustrated in various views in FIG. 1 has a central cylindrical tube 1 as a longitudinal part, the cylindrical axis of which defines a longitudinal direction of the frame. The tube 1 is designed to be flexurally and torsionally rigid so that it ensures the desired load capacity and stability of the frame. At each longitudinal end of the tube 1 a substantially square transverse part 2, 2' is welded, the main plane of which extends transverse to the cylindrical axis of the tube 1, the cylindrical axis in each case running through a center region of the transverse parts 2, 2'. By use of a laser cutting beam the transverse parts 2, 2' are cut out from a metal sheet that is very thin compared to the length of the central tube 1.

At a radial distance (with respect to the cylindrical axis) from the central tube 1, four additional frame parts extend parallel to the longitudinal direction, and in each case their longitudinal ends meet the transverse parts 2, 2' in the corner regions thereof, and are welded to the transverse parts 2, 2' at these points. Three of these additional frame parts, designated by reference numerals 3, 3', and 3," are visible in FIG. 1. The view of the fourth frame part is obstructed by the central tube 1.

The additional frame parts 3, 3', and 3," the same as for the central tube 1, are formed by cylindrical tubes. However, their cross sections are significantly smaller than the cross section of the central tube 1. Thus, the central tube 1 occupies an inner circular disk-shaped region of each of the two plate-shaped transverse parts 2, 2', whereas the four additional frame parts 3, 3', and 3" meet the transverse parts in the edge region of the plate-shaped transverse parts 2, 2' which surrounds this inner region.

To support the frame on the floor, two feet 5, 5' at a mutual distance from one another are attached by welding, for example, to each of the two plate-shaped transverse parts 2, 2' in the region adjacent to their outer edge 4 facing the floor. The feet 5, 5' are designed to be adjustable in height by the fact that their parts facing the floor may be screwed at a greater or lesser depth into their parts attached to the transverse parts 2, 2'.

Between the plate-shaped transverse parts 2, 2', five plate-shaped lower transverse bars 6.1 through 6.5 are provided which extend parallel to the main plane of the transverse parts 2, 2' and which are situated in the longitudinal direction at a uniform mutual distance from one another. The lower transverse bars 6.1 through 6.5 immediately adjacent to the transverse parts 2, 2' are separated from the transverse parts 2, 2' by this same distance. At their ends facing the floor, the lower transverse bars 6.1 through 6.5 are bordered by a substantially straight edge 7 which extends between the two frame parts adjoining the floor, one of which is visible in FIG. 1 below reference numeral 3." The lower transverse bars 6.1 through 6.5 are each connected, for example by welding, to these two frame parts. The end of each of the lower transverse bars 6.1 through 6.5 on the opposite side from the edge 7 is recessed in an approximately semicircular shape so as to complement the cross section of the central tube 1, and is welded to the central tube 1 over the length of this recess. As a result of this configuration, the lower transverse bars 6.1 through 6.5 serve as additional reinforcement for the frame.

Three retaining plates 8.1 through 8.3 extend between the additional frame parts 3', 3" vertically superposed with respect to the floor. These retaining plates likewise are very thin in the longitudinal direction and run parallel to the main plane of the transverse parts 2, 2'. The vertical outer edge 9 of each retaining plate 8.1 through 8.3 which points outwardly with respect to the frame is straight. In its region horizontally opposite from the outer edge 9, each of the retaining plates 8.1 through 8.3 is recessed in a semicircular shape which complements the cross section of the central tube 1, and is connected to the central tube 1 by welding, for example. Corresponding connections exist between each of the retaining plates 8.1 through 8.3 and the two frame parts 3', 3."

A pair of retaining plates 10.1, 10.2 similar to the retaining plates 8.1 through 8.3 is provided on the side of the frame horizontally opposite from the retaining plates 8.1 through 8.3. The retaining plates 10.1, 10.2 are connected to the upper frame part 3 and the lower frame part (not visible in FIG. 1), as well as to the central tube 1, in a similar manner as the retaining plates 8.1 through 8.3.

In the region of the longitudinal center of the frame, two retaining bars 11.1, 11.2 are situated on the top side of the central tube 1 opposite from the floor, and extend parallel to the main plane of the transverse parts 2, 2'. The retaining bars are recessed in a semicircular shape on their side facing the central tube 1 so as to complement the cross section of the central tube 1, and are welded along this recess to the central tube 1. The ends of the retaining bars on the opposite side are straight, and run horizontally.

With respect to the longitudinal direction lateral to the retaining bars 11.1, 11.2, two upper transverse bars 12.1, 12.2 extend parallel to the main plane of the transverse parts 2, 2', and relative to the cylindrical axis of the central tube 1 have an substantially mirror-symmetrical shape with respect to the lower transverse bars 6.1 through 6.5, and are similarly fixed to the central tube 1 and the two upper frame parts 3, 3'.

In addition, a total of four supports 13.1 through 13.4 extend between the two upper frame parts 3, 3', parallel to the main plane of the plate-shaped transverse parts 2, 2', on which the conveyor belt elements may be mounted.

Figure 2:
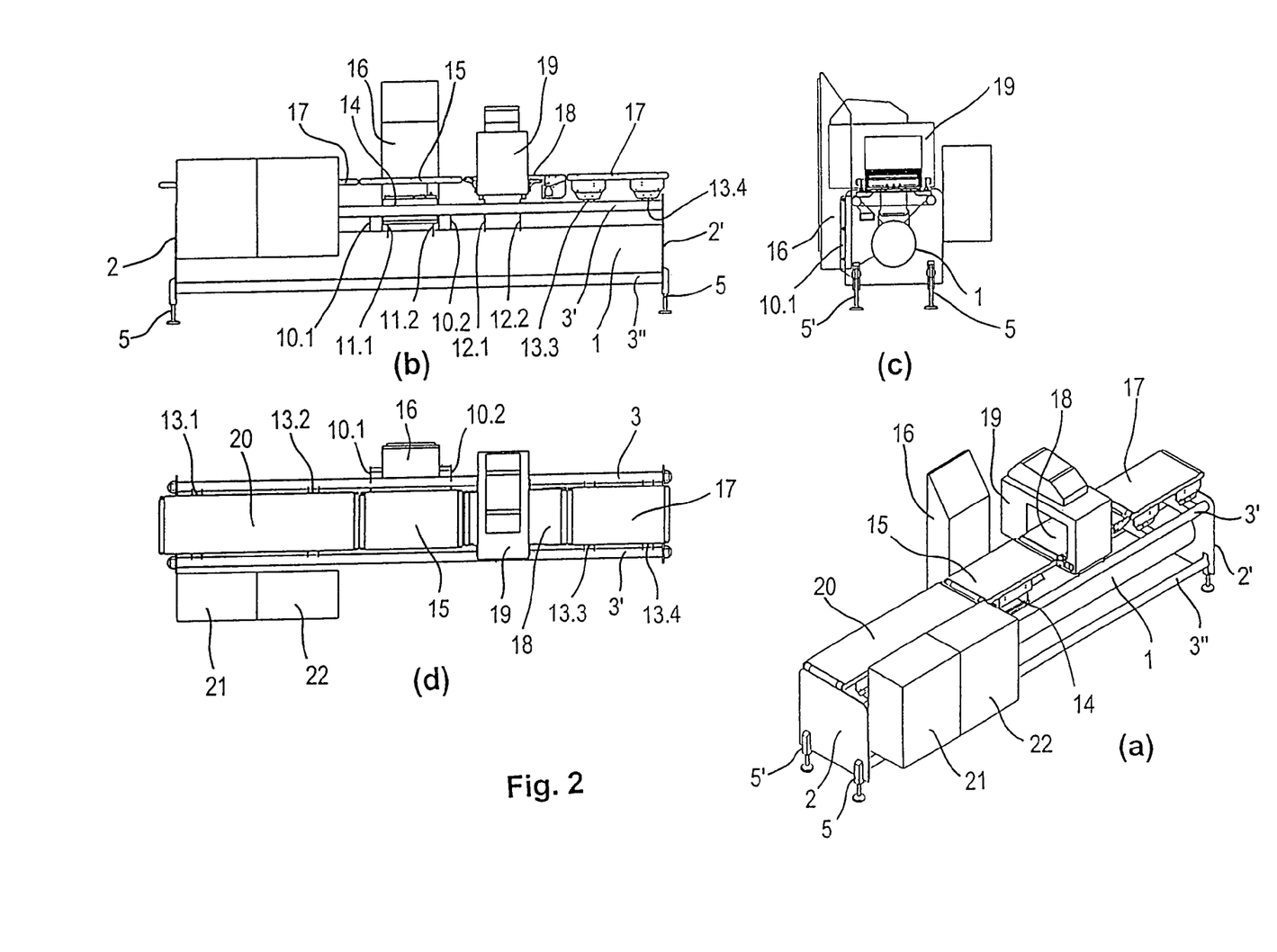
FIG. 2A is a perspective view from above of a suitable operating environment for a monitoring scale system with various components mounted on the support frame as presented in FIGS. 1A-1D, in accordance with various embodiments.
FIG. 2B is a side view of the monitoring scale system, as presented in FIG. 2A in further detail, in accordance with various embodiments.
FIG. 2C is an end view of the monitoring scale system, as presented in FIG. 2A in further detail, in accordance with various embodiments.
FIG. 2D is a top view of the monitoring scale system, as presented in FIG. 2A in further detail, in accordance with various embodiments.

In FIG. 2, a monitoring scale system with the frame illustrated in FIG. 1 is equipped with various components, including a load cell 14 mounted on the retaining bars 11.1, 11.2, on which a weighing belt 15 which circulates in the longitudinal direction is supported. The load cell 14 is connected to a control and evaluation unit which assists in the operation as a monitoring scale. This control and evaluation unit is accommodated in a housing 16 which is attached to the lateral retaining plates 10.1, 10.2.

In the operation of the monitoring scale system, packages are delivered to the weighing belt 15, and during their passage over the weighing belt 15, in a transport direction running from right to left in the views in FIG. 2, are dynamically weighed by the load cell 14. The packages are supplied by an entry belt 17, situated upstream from the weighing belt 15 with respect to the direction of travel, which is mounted on the two supports 13.3 and 13.4. The discharge end of the entry belt 17 adjoins the feed end of a transport belt 18, likewise running in the longitudinal direction, for a metal detector 19 designed in the shape of a tunnel. In this manner the transport belt 18 takes the packages supplied by the entry belt 17 and leads them through the metal detector 19 to the discharge end of the transport belt 18. The latter adjoins the feed end of the weighing belt 15 and thereby transfers the packages to the weighing belt 15. This metal detector 19 is mounted on the upper transverse bars 12.1, 12.2.

The feed end of an exit belt 20 adjoins the discharge end of the weighing belt 15, and takes the packages received from the weighing belt 15 and conveys them in the longitudinal direction. The exit belt 20 is supported by supports 13.1 and 13.2.

Two ejection bins 21, 22 are attached along the exit belt 20 between the lateral retaining plates 8.1 and 8.2 or 8.2 and 8.3. Packages for which the metal detector 19 has responded or which have been identified as off-weight as the result of dynamic weighing by the load cell 14 are ejected into these ejection bins with the assistance of two pushing devices (not illustrated) which act transverse to the transport direction of the exit belt 20 and which are controlled by the control and evaluation unit situated in the housing 16.

Figure 3:
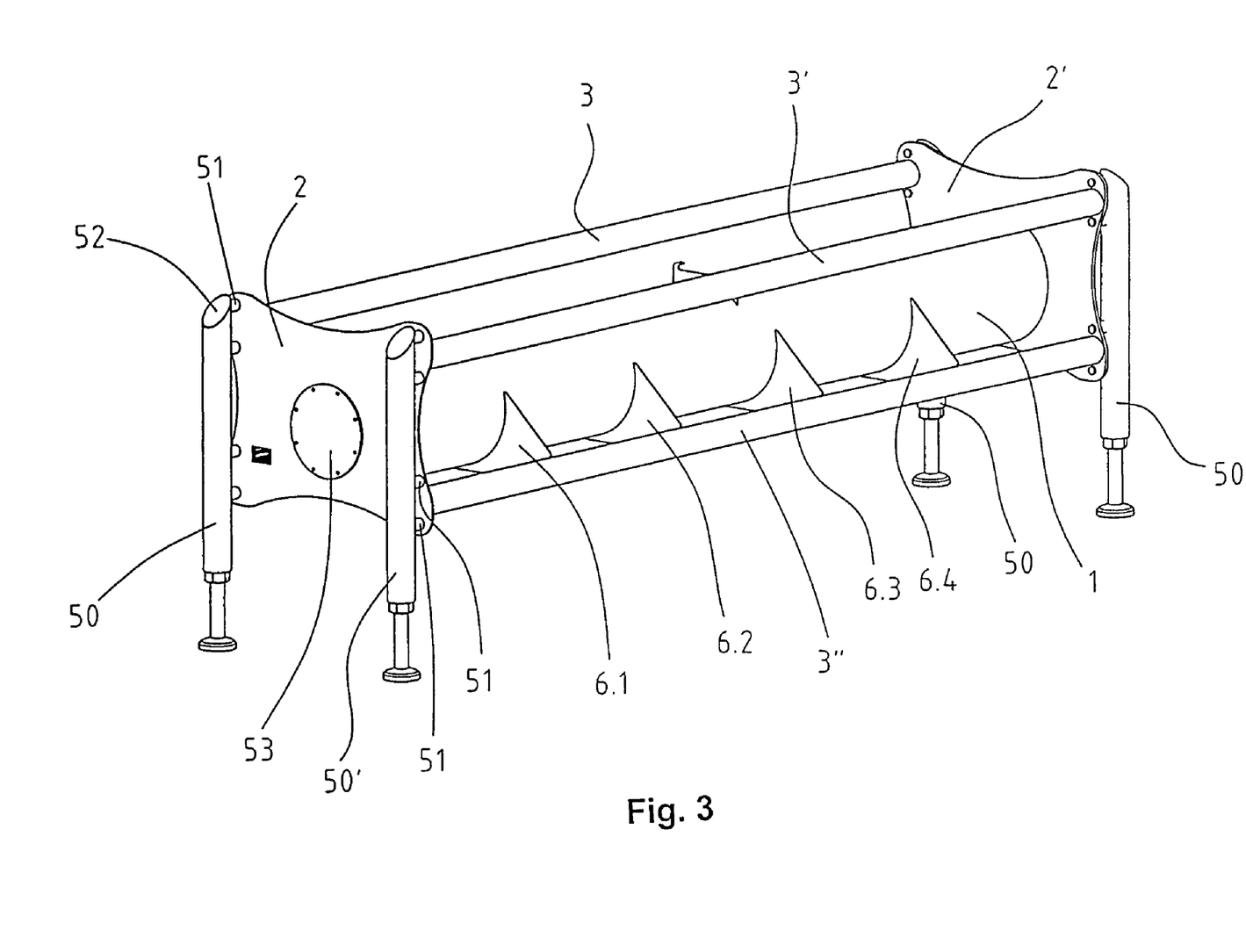
FIG. 3 is a perspective view from above of another support frame for a monitoring scale in accordance with various embodiments.

The embodiment of the support frame illustrated in FIG. 3 differs from that shown in FIGS. 1 and 2 in that in FIG. 3, the feet 50, 50' are situated at a short distance from one another in relation to the longitudinal direction of the frame, in front of the plate-shaped transverse parts 2, 2' thereof. This distance is adjusted by spacing elements 51 which extend in the longitudinal direction of the frame between the respective feet 50, 50' and the respective transverse parts 2, 2'. A further difference is that the feet 50, 50' extend over the entire vertical height of the transverse parts 2, 2', in the manner of a column.

Incidentally, the frame illustrated in FIG. 3 may contain all the design elements illustrated in FIGS. 1 and 2. The additional frame parts 3, 3', and 3" which are also present in the embodiment of FIGS. 1 and 2 are visible in the configuration illustrated in FIG. 3. FIG. 3 also shows the lower transverse bars 6.1 through 6.4 present in FIGS. 1 and 2, which differ from FIGS. 1 and 2 only with respect to their quantity. Compared to FIGS. 1 and 2, in FIG. 3 the edges of the transverse parts 2, 2' are shaped so as to be bowed slightly inward from the corners. The attachment point of the feet 50, 50' to the transverse parts 2, 2' is situated in the region of the corners. The upper ends 52 of the feet 50, 50' are designed as surfaces inclined with respect to the horizontal, so that no deposits can remain there as well.

Figure 4:
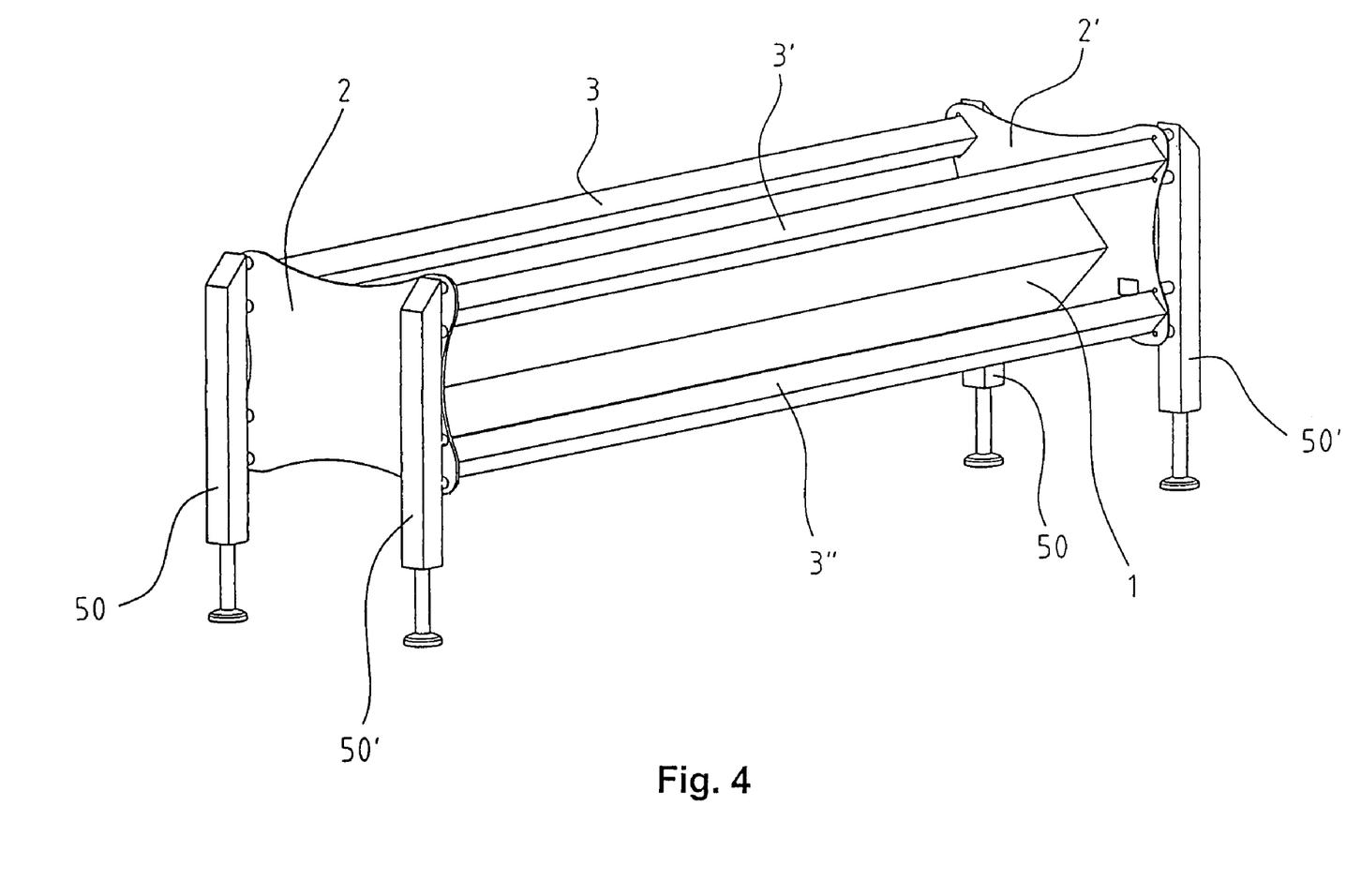
FIG. 4 is a perspective view from above of a further support frame for a monitoring scale with in accordance with various embodiments.

The embodiment of the support frame illustrated in FIG. 4 corresponds to the embodiment shown in FIG. 3, except that, in a deviation from the circular cross sections of the central tube 1, the frame parts 3, 3', 3," and the feet 5, 5' in FIG. 3, these parts in FIG. 4 have a square or rectangular cross section. To avoid the accumulation of deposits in this case as well, the central tube 1 and the frame parts 3, 3', 3" are aligned so that the diagonals of their square or rectangular cross sections are oriented vertically, i.e., perpendicular to the floor.

Figure 5:
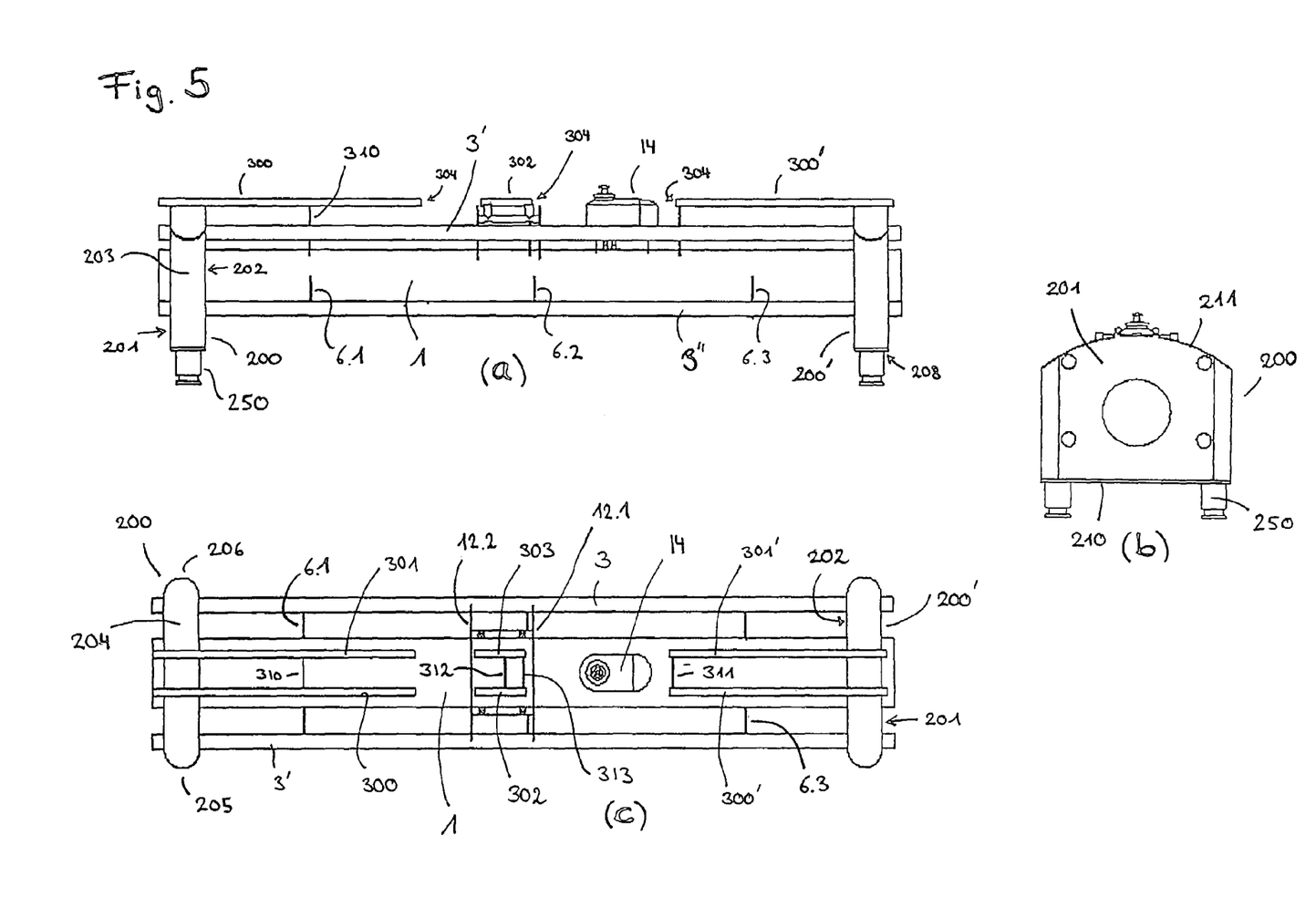
FIG. 5A is a side view from above of an additional support frame for a monitoring scale in accordance with various embodiments.
FIG. 5B is a end view of the frame, as presented in FIG. 5A in further detail, in accordance with various embodiments.
FIG. 5C is an top view of the frame, as presented in FIG. 5A in further detail, in accordance with various embodiments.
Figure 6:
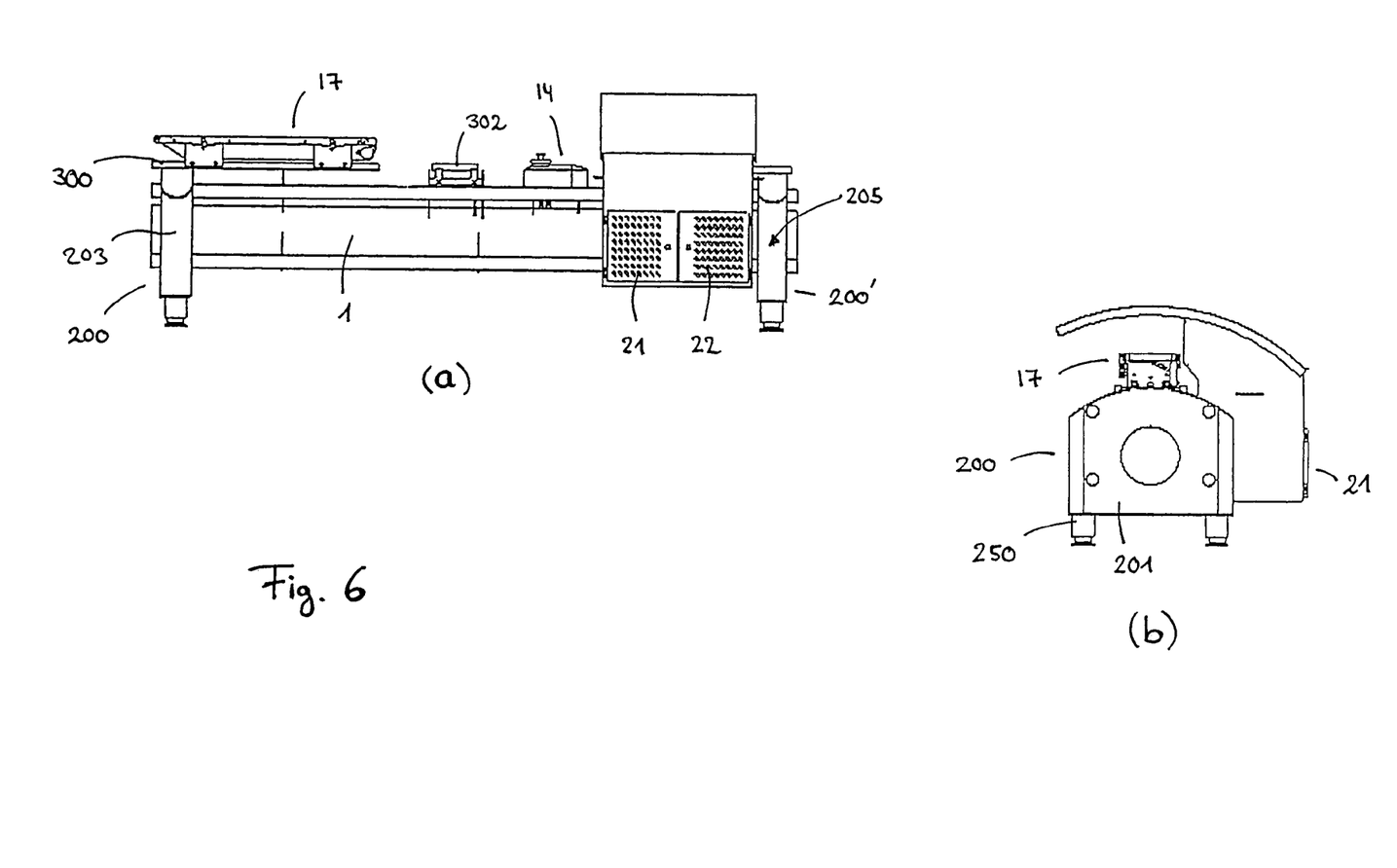
FIG. 6A is a side view of a suitable operating environment for a monitoring scale system with various components mounted on the support frame as presented in FIGS. 5A-5C, in accordance with various embodiments.
FIG. 6B is a end view of the monitoring scale system, as presented in FIG. 6A in further detail, in accordance with various embodiments.
FIG. 6C is a view from above of the monitoring scale system, as presented in FIG. 6A in further detail, in accordance with various embodiments.
FIG. 6D is a view from below of the monitoring scale system, as presented in FIG. 6A in further detail, in accordance with various embodiments.
Figure 7:
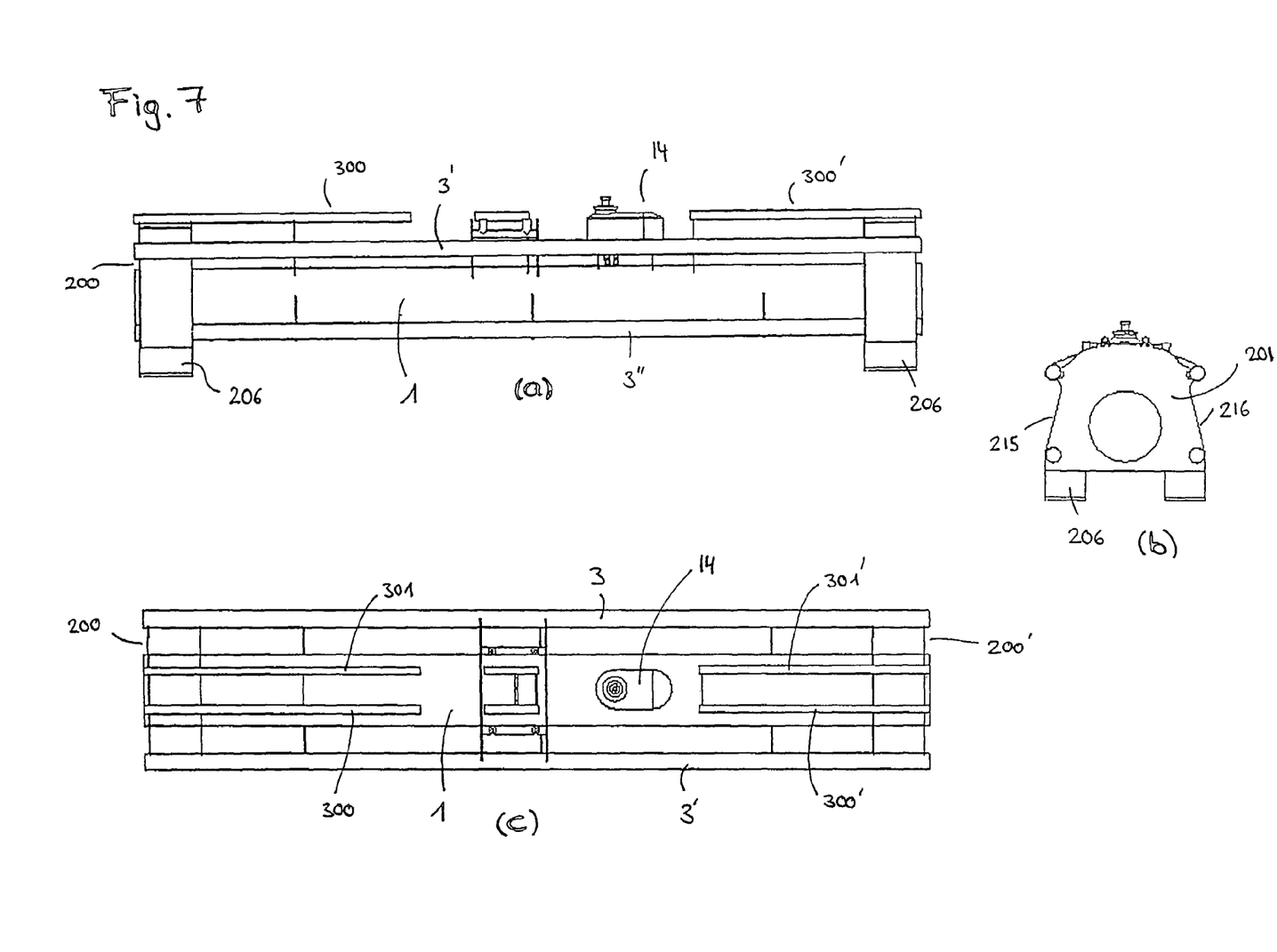
FIG. 7A is a side view from above of yet another support frame for a monitoring scale in accordance with various embodiments.
FIG. 7B is a end view of the frame, as presented in FIG. 7A in further detail, in accordance with various embodiments.
FIG. 7C is an top view of the frame, as presented in FIG. 7A in further detail, in accordance with various embodiments.

Embodiments of the support frame designed according to the invention are described in FIGS. 5 through 7. Compared to FIGS. 1 through 4, here it is noted that the transport direction, in particular in the view of FIG. 6, runs from left to right (and not from right to left as in the views of FIG. 2). In addition, although the basic structure of the frame is not repeated, similar parts are designated by the same corresponding reference numerals. The modifications of a frame according to the invention compared to the frame upon which the invention is based are described with reference to advantageous embodiments.

In the embodiment illustrated in FIG. 5, the support frame has two hollow body-like transverse parts 200, 200', and a plurality of longitudinal supports 300, 301, 300', 301', 302, and 303. However, the longitudinal supports 300 through 303 may also be implemented independently of the two hollow body-like transverse parts 200, 200' in FIG. 5 by use of the plate-like transverse parts 2, 2' according to FIG. 1.

In the embodiment illustrated in FIG. 5, the two hollow body-like transverse parts 200, 200' as shown in FIGS. 5a and 5c, at the longitudinal end regions of the longitudinal part 1, replace the plate-like transverse parts shown in FIG. 1. The hollow body-like transverse part 200 has two flat, parallel side surfaces 201 and 202. These are surrounded along their periphery by a lateral surface 203 and are connected thereto. By use of a laser cutting beam, all surfaces 201, 202, 203 are cut out from a metal sheet which is very thin compared to the length of the central tube 1, whereby it is not necessary for the lateral surface 203 to be designed as a single piece. The lateral surface 203 has two side regions 205 and 206, a top region 204, and a region 208 facing the floor. As shown in FIG. 5b, the top-side region 204 of the lateral surface 203 has a convex shape which conforms to a convex top edge 211 of the lateral surface 201. It is evident from FIG. 5c that lateral regions 205, 206 of the lateral surface 203 are also outwardly curved. Both transverse parts 200, 200' rest on height-adjustable feet 250 which are screwed from below into the base surface 208 of the lateral surface 203. However, the feet may also be laterally attached to the transverse part, as illustrated in FIG. 3, for example. The feet 250 themselves are height-adjustable in this embodiment.

As shown particularly clearly in FIGS. 5a and 5c, both the longitudinal part 1 and the additional frame parts 3, 3' project through the transverse parts 200, 200', and the longitudinal supports 300, 301, 300', 301' project beyond the transverse parts 200, 200' on which they are supported and fixed. However, a configuration is also possible in which, for example, the longitudinal part 1 and the additional frame parts 3, 3', 3" terminate at one or both transverse parts 200, 200'.

In this embodiment three pairs of longitudinal supports are present, the first comprising the supports 300, 301 supported on the transverse part 200 and the support bar 310, the second comprising the longitudinal supports 300', 301' supported on the transverse part 200' and the support bar 311, and the third comprising the shorter longitudinal supports 302, 303 supported and fixed on the two support bars 312 and 313. The longitudinal supports are attached to the transverse parts or support bars by welding.

With regard to these support bars, in this embodiment only the minimum number of one support bar for the longitudinal supports 300, 301 and 300', 301' and two support bars for the longitudinal supports 302, 303 are implemented. Of course, however, depending on the length of the corresponding pairs, additional support bars could also be installed. As shown in FIG. 5a, the support bars 301, 311, 313 are supported and fixed on the supporting part 1, in this case by welding. The lugs provided on the side of the support bars 301 through 313 on the side opposite from the floor, onto which the longitudinal supports 300 through 303 are welded, are not shown in the drawing; however, no region of the support bar projects beyond the plane defined by the longitudinal supports. In addition, the support bars 310 through 313 are mounted and attached to the retaining bars 11.1, 11.2 according to FIG. 1, regardless of whether they extend vertically higher than the retaining bars.

In this embodiment, the support bars 300, 301, 300', 301', as illustrated in FIGS. 5a and 5c, rest on the frame and are welded thereto. In other words, a conveyor belt element attached to such a pair of longitudinal supports 300, 301 by means of a suitable clamping device may be displaced along the longitudinal direction, thereby projecting beyond the end of a transverse part 200, 200'. In this exemplary embodiment shown in FIG. 5, the entry belt 17 is attached to the longitudinal supports 300, 301, the transport belt 18 is attached to the pair of longitudinal supports 302, 303, and the exit belt 20 is attached to the pair of longitudinal supports 300', 301'. Room for the load cell 14 together with the associated weighing belt 15 is provided between the pair of longitudinal supports 302, 303.

The inlet openings in the hollow bodies 1, 200, 200' present in this exemplary embodiment are not shown in the figures; however, the inlet opening is provided at an upper region of the hollow bodies, and the outlet opening is provided at the lower region of the hollow bodies, such as the outlet opening 254 in FIG. 6d. The lower end of the ventilation pipe 255 is indicated here as well.

The frame from FIG. 5 is illustrated once again in FIG. 6a through 6d, in this case showing several components: the entry belt 17 is mounted on the longitudinal supports 300, 301. It is clearly seen that the entry belt 17 extends outwardly beyond the transverse part 200. Also illustrated are the ejection bins 21, 22, which, viewed in the direction of the conveyor belt, are mounted just in front of the transverse part 200'. Furthermore, the components are attached to the frame exactly as in the exemplary embodiment shown in FIG. 2, with the exception of the conveyor belt elements 17, 18, and 20. These elements have been mounted on supports 13.1 through 13.4 according to FIG. 2, but for one frame according to the invention (in particular as shown in FIG. 6c) the elements are mounted on the longitudinal supports 300, 301; 300', 301'; and 302, 303. Additional components are mounted as shown in FIG. 2.

A further embodiment of this invention is illustrated in FIG. 7a through 7c. Compared to the first exemplary embodiment of this invention (FIGS. 5 and 6), the flat, parallel side areas of the transverse parts designed as hollow bodies are recessed inwardly at their side edges 215, 216, as shown particularly clearly in FIG. 7b. In this manner the side part 200 or 200' transverse to the longitudinal direction does not project beyond the additional frame parts 3, 3', 3," so that components such as the ejection bins 21, 22, for example, may be mounted directly at the location, with respect to the longitudinal direction, at which the transverse part 200, 200' itself is provided. FIGS. 7a and 7b also show height adjustment elements 206 which are welded to the base region 208 of the lateral surface 203.

These height adjustment elements provided as additional hollow bodies are then used when, for example, the height of the frame is subsequently changed. In this exemplary embodiment as well (not shown in FIG. 7, however), height-adjustable feed are screwed in, specifically, at the side of the height adjustment elements 206 facing the floor.

It is noted that the implementations of the present invention illustrated in these exemplary embodiments are to be regarded strictly as examples. Thus, for example, the plate-like transverse parts 2, 2' of the exemplary embodiments described in FIGS. 1 through 4 may be replaced by the transverse parts 200, 200' designed as hollow bodies according to FIG. 5 without also replacing the support bars 310 through 313 or the longitudinal supports 300 through 303, or only portions thereof. Likewise, the longitudinal supports 300 through 303 or also only portions thereof may be used, whereby the transverse parts 2, 2' are plate-like as shown in FIG. 1, or a plate-like transverse part 2 is used on one end and a hollow body-like transverse part 200' is used on the other end.

The invention claimed is:

1. A frame for a monitoring scale, comprising:
a longitudinal part extending in a longitudinal direction and at least one transverse part fixed on the longitudinal part, the at least one transverse part extending transversely to the longitudinal direction and adapted to support the frame on a floor; and
said frame being adapted to carry a monitoring scale such that a load cell of the monitoring scale is supported on the frame, and that a weighing belt of the monitoring scale supported on the load cell circulates in the longitudinal direction for transporting weighed goods,
wherein the at least one transverse part is a hollow body comprising a filling opening and is adapted to be filled with a ballast material.

2. The frame of claim 1, wherein the hollow body has an substantially cubic basic shape.

3. The frame of claim 1, wherein the hollow body has an substantially flat first side area which extends transverse to the longitudinal direction.

4. The frame of claim 3, wherein the hollow body has an substantially flat second side area situated parallel to the first side area.

5. The frame of claim 4, wherein the first and second side areas are formed by side walls of the hollow body in a form of a plate.

6. The frame of claim 5, wherein a top edge, opposite from a base edge, of each plate-like side wall has a convex shape.

7. The frame of claim 5, wherein the hollow body has a lateral surface which connects the edges of the two side walls.

8. The frame of claim 7, wherein a top-side region of the lateral surface has a convex shape which conforms to a convex top edge.

9. The frame of claim 8, wherein a lateral region of the lateral surface extending between the base edges and the top edges is outwardly curved with respect to the longitudinal direction.

10. The frame of claim 1, wherein each transverse part is mounted on two longitudinal end regions of the longitudinal part.

11. The frame of claim 1, wherein the longitudinal part and/or an additional frame part passes through and/or extends beyond the at least one transverse part.

12. The frame of claim 11, wherein adjacent ends of respective transverse parts are aligned with one another transverse to the longitudinal direction.

13. The frame of claim 1, wherein a cross section of the longitudinal part and/or each longitudinal support extending parallel thereto and/or each additional frame part extending parallel thereto has a convex shape in regions facing away from the floor.

14. The frame of claim 1, wherein the longitudinal part is designed as a hollow tube.

15. The frame of claim 1, wherein said filling opening comprises a quick-connect coupling for filling the at least one transverse part with ballast material.

16. The frame of claim 15, wherein the longitudinal part and/or the hollow body of the at least one transverse part includes a screw-type outlet opening.

17. The frame of claim 16, wherein a ventilation pipe inside the hollow body extends from a lower region to a topmost region of the hollow body.

18. The frame of claim 15, wherein the ballast material is an antiseptic medium.

19. The frame of claim 18, wherein the antiseptic medium is $H_2O$ with added disinfectant.

20. The frame of claim 18, wherein the antiseptic medium is dyed.

21. The frame of claim 1, wherein height-adjustable feet are attached to at least one of the transverse parts for supporting the frame on the floor.

22. The frame of claim 1, wherein the apparatus includes at least one additional frame part extending parallel to the longitudinal part and fixed to the at least one transverse part.

23. The frame of claim 22, wherein each additional frame part has a smaller cross section than the longitudinal part.

24. The frame of claim 22, wherein each longitudinal support has a smaller cross section than the at least one additional frame part.

25. The frame of claim 22, wherein the longitudinal part is provided at an inner region of a transverse part, and each additional frame part extending parallel thereto is provided at an edge region of the transverse part surrounding the inner region.

26. The frame of claim 25, wherein each additional frame part is provided in corner regions of the transverse part, and in particular lateral regions/side edges of the transverse part are recessed so that the transverse part projects in a direction transverse to the longitudinal direction, substantially within the additional frame parts.

27. A frame for a monitoring scale, comprising:
a longitudinal part extending in a longitudinal direction and at least one transverse part fixed on the longitudinal part, the at least one transverse part extending transversely to the longitudinal direction and adapted to support the frame on a floor;
said frame being adapted to carry a monitoring scale such that a load cell of the monitoring scale is supported on the frame and that a weighing belt of the monitoring scale supported on the load cell circulates in the longitudinal direction for transporting weighed goods; and
at least one longitudinal support, extending parallel to the longitudinal part of the frame and having one end facing toward space provided for the load cell and situated at a distance therefrom.

28. The frame of claim 27, wherein at least one of the at least one longitudinal support has an elliptical or a circular cross section.

29. The frame of claim 27, wherein the frame includes at least one plate-shaped support bar having a main plane transverse to the longitudinal direction, and a side configured to face the floor fixed to a side of the longitudinal part configured to face away from the floor.

30. The frame of claim 29, wherein each longitudinal support is supported on one of the at least one plate-shaped support bars.

31. The frame of claim 30, wherein the at least one longitudinal support further includes two longitudinal supports to form a pair, the two longitudinal supports are parallel to each other and situated at a distance from one another, and are supported and fixed on at least two support bars close to a center region of the longitudinal part.

32. The frame of claim 30, wherein the at least one longitudinal support further includes a pair of longitudinal supports, the pair of longitudinal supports are parallel to each other and are situated at a substantially constant distance from one another, the pair extend from a region close to a longitudinal end region of the longitudinal part in a direction of a center of the longitudinal part, the pair is supported and fixed on a transverse part and at least one support bar.

33. The frame of claim 32, wherein each of two ends of the longitudinal supports of a mutually facing pair are aligned with one another transverse to the longitudinal direction.

34. The frame of claim 33, wherein the mutual distance between the longitudinal supports of a pair is equal to or less that the width of a conveyor belt element configured to transport the weighed goods.

35. The frame of claim 32, wherein one of the pairs of longitudinal supports is supported on one of the at least one transverse part, and projects beyond the end of the at least one transverse part facing away from the load cell, and/or projects beyond a respective end of the longitudinal part.

36. The frame of claim 32, wherein two lugs separated at a distance from one another are provided at a region of one of the support bars facing away from the floor, and a pair of longitudinal supports fixed thereto is aligned with the lugs in the longitudinal direction, substantially parallel to the floor.

37. The frame of claim 36, wherein each longitudinal support has a smaller cross section than the longitudinal part.

38. A method, comprising:
opening a filling opening of a hollow body of a support frame for a monitoring scale, said hollow body being a transverse part of a support frame and being fixed on a longitudinal part of the support frame extending in a longitudinal direction, said transverse part extending transversely to the longitudinal direction and being adapted to support the frame on a floor;
filling the associated hollow body with a ballast material to stabilize the support frame; and
closing the filling opening.

39. The method of claim 38, wherein the ballast material is an antiseptic medium.

40. The method of claim 39, wherein the antiseptic medium is $H_2O$ with added disinfectant.

41. The method of claim 39, wherein the antiseptic medium is dyed.

42. The method of claim 38, wherein the filling and the closing are carried out at an installation site for the support frame.

* * * * *